Nov. 18, 1952     M. D. WELSH     2,618,318
SEAT FOR BABY FURNITURE
Filed June 15, 1949

INVENTOR
MATILDA D. WELSH
BY *John H. Cassidy*
ATTORNEY

Patented Nov. 18, 1952

2,618,318

UNITED STATES PATENT OFFICE 2,618,318

SEAT FOR BABY FURNITURE

Matilda D. Welsh, Ladue, Mo.

Application June 15, 1949, Serial No. 99,176

2 Claims. (Cl. 155—127)

This invention pertains to an improvement in a seat for baby furniture such as that of a baby swing illustrated and described in a patent for Baby Swing, Patent No. 2,252,224, filed June 30, 1939, by Albert D. Welsh. Briefly stated, it includes a removable U-shaped horizontal bow forming a part of a frame upon which a unitary canvas seat is supported. By virtue of the removability of the supporting bow from the rest of the frame, provision is made for the quick and easy removal of the canvas seat for the purpose of laundering the same. The present invention is adaptable for use with various types of baby furniture, such as swings, strollers, chairs, etc.

Figure 1:
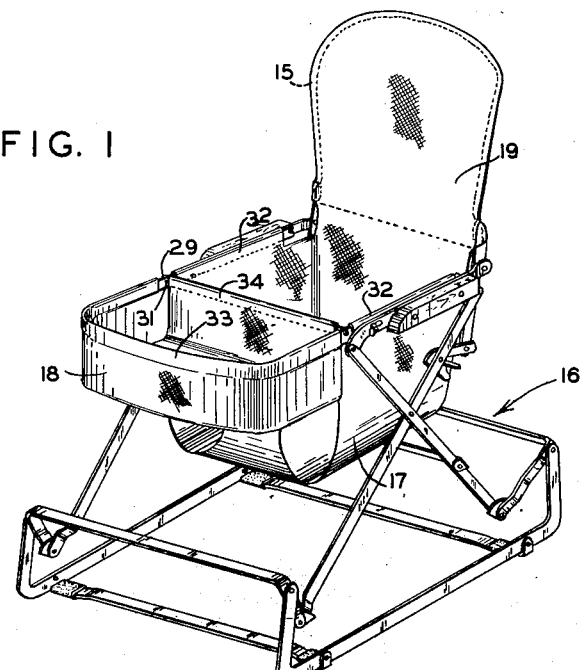
Figure 2:
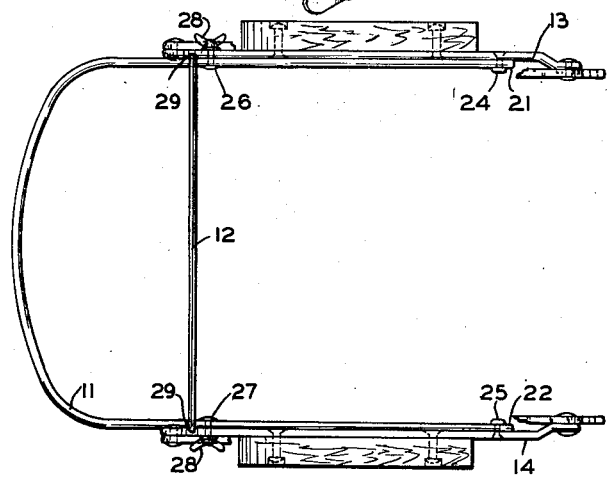
Figure 3:
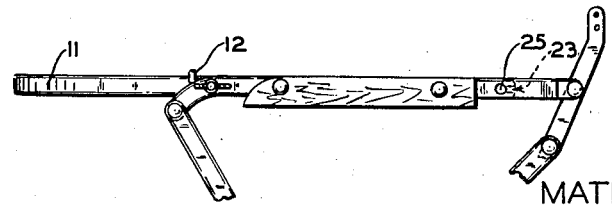

In the accompanying drawing, Fig. 1 is an isometric view of a seat for baby furniture embodying the instant invention and showing the same as applied to a baby swing;

Fig. 2 is a plan view of the frame of the baby seat showing a removable bow section thereof; and Fig. 3 is a side view of the frame section shown in Fig. 2.

As illustrated in the several views, the instant invention includes a seat frame comprising a horizontally disposed U-shaped bow 11, a removable cross-rod support 12, two side arms 13 and 14 and a back rest bow member 15.

The seat frame comprising the principal elements just described may be supported on the sub-structure of any suitable type of baby furniture, such as a stroller, chair or swing, the connections therefor being made to the side arms 13 and 14. In the illustrative example, it is attached to a swing sub-structure, generally designated by the reference numeral 16.

Also forming a part of the seat of the instant invention is a unitary canvas member providing a seat 17, a tray 18 and a back rest 19, the latter taking the form of an envelope passed over the bow 15. The seat 17 and tray 18 are supported on, and depend from, the U-shaped bow 11 and cross-rod 12.

The U-shaped bow 11 is removably connected to the side arms 13 and 14 in the following manner. Each of the ends 21 and 22 of the member 11 are provided with an open ended slot 23 forming a fork (Fig. 3) which is adapted to pass over headed pins 24 and 25 secured, respectively, to the side arms 13 and 14. Also serving as a part of the attaching means are two bolts 26 and 27 which are provided with wing nuts 28. The bolts 26 and 27 are removable and are passed through aligned holes in the canvas seat 17, the member 11 and the side arms 13 and 14.

Snap fasteners, known to the art and available on the market, and of some variety, may well be substituted for the bolts 26 and 27.

Hooked ends 29 are formed on the cross-rod 12 which are sprung into holes 31 in the member 11 to attach the former to the latter, the cross-rod itself being adapted to rest on top of the bow member as a support for the front of the seat 17 and the back of the tray 18. The hooked ends 29 of the rod encircle the upper portion of the bow and thence double back to pass through the horizontal holes 31.

In assembling the seat, the back rest 19 is passed into position over the bow 15. Next, the member 11 is passed, starting at one end thereof, successively through a first portion of a hemmed section 32 of the seat 17, thence through a hemmed section 33 of the tray 18 and then through the remaining portion of the seat's hemmed section 32 until the ends of the U-shaped bow 11 are exposed. The ends of the bow 11 are then passed onto the pins 24 and 25 and the bolts 26 and 27 are secured in place to complete the connection of the bow 11 to the arms 13 and 14.

Attachment of the canvas to the frame is completed by passing the cross-rod 12 through a hemmed section 34 common to the seat 17 and tray 18, and springing the rod into position on the bow 11. The bolts 26 and 27 may, however, be left loose prior to the attachment of the cross rod 12, so as to permit the inward displacement of the bow 11, thus allowing easy insertion of the hooked ends 29 into the holes 31.

A reversal of the above procedure in an obvious manner provides for the quick and easy removal of the canvas from the seat frame for cleaning purposes.

Various changes may be made in the details of construction, within the scope of the appended claims, without departing from the spirit of this invention. Parts of the invention may be used without the whole and improvements may be added while retaining some or all of the advantages of the invention.

What is claimed is:

1. In a seat for baby furniture having a unitary canvas member forming a back rest, seat and tray supportable on a frame having a back rest member and two supported side arms, the improvement comprising a bow member for partially supporting said canvas seat and tray having open ended slots in its ends, a headed bolt secured to each of said side arms passing into one of said slots, two removable fasteners connecting said bow member to said side arms, a cross-rod for supporting a part of said canvas member common to said seat and said tray, and releasable connections between said cross rod and said bow member.

2. In a seat for baby furniture having a unitary canvas member forming a back rest, seat and tray supportable on a frame having a back rest member and two supported side arms, the improvement comprising a resilient bow member for partially supporting said canvas seat and tray, means for removably connecting said bow member to said side arms, and a cross-rod removably connected to said bow member for supporting a part of said canvas member common to said seat and said tray by means of hooks on its ends engaging in holes in the bow member.

MATILDA D. WELSH.

REFERENCES CITED

The following references are of record in the file of this patent:

UNITED STATES PATENTS

| Number | Name | Date |
| --- | --- | --- |
| 386,142 | Lewis | July 17, 1888 |
| 1,740,949 | Luery | Dec. 24, 1929 |
| 1,750,435 | Silver | Mar. 11, 1930 |
| 2,168,513 | Cobb | Aug. 8, 1939 |